United States Patent [19]

Takahashi et al.

[11] 4,226,564
[45] Oct. 7, 1980

[54] APPARATUS FOR FEEDING GLASS BATCH MATERIALS INTO A GLASS MELTING FURNACE

[75] Inventors: Shiro Takahashi, Yokohama; Yoshihiro Tsuchimoto, Funabashi, both of Japan

[73] Assignee: Asahi Glass Company, Limited, Tokyo, Japan

[21] Appl. No.: 907,014

[22] Filed: May 17, 1978

[30] Foreign Application Priority Data

May 24, 1977 [JP] Japan ................................ 52-59432
Jun. 14, 1977 [JP] Japan ................................ 52-69429

[51] Int. Cl.³ .............................................. C03B 3/00
[52] U.S. Cl. ................................... 414/166; 65/335; 414/217
[58] Field of Search ................................ 414/217–220, 414/156, 160, 165, 166, 292; 65/335

[56] References Cited

U.S. PATENT DOCUMENTS

| 1,906,695 | 5/1933 | Lufkin | 65/335 |
| 2,261,022 | 10/1941 | Fox | 414/160 X |
| 2,281,050 | 4/1942 | Redshaw | 414/166 |
| 2,471,336 | 5/1949 | Lorenz | 414/166 |
| 2,556,467 | 6/1951 | Cannon, Jr. | 414/166 |
| 3,077,273 | 2/1963 | Zellers, Jr. | 414/166 |
| 3,780,889 | 12/1973 | Frazier et al. | 414/166 |
| 3,929,445 | 7/1974 | Zippe | 65/335 |

*Primary Examiner*—Stephen G. Kunin
*Assistant Examiner*—Terrance L. Siemens
*Attorney, Agent, or Firm*—Oblon, Fisher, Spivak, McClelland & Maier

[57] ABSTRACT

A blanket feeder type glass batch feeding apparatus for preventing the leakage of the atmosphere in a glass melting furnace is provided. The glass batch feeding apparatus comprises a sealing case for surrounding a reciprocally movable batch feeding trough and extending to a batch feeding opening of the glass melting furnace, a shelter plate disposed at the outlet of the sealing case and a damper plate disposed in the sealing case wherein the shelter plate and the damper plate are respectively contacted with a glass batch layer fed into the apparatus.

9 Claims, 8 Drawing Figures

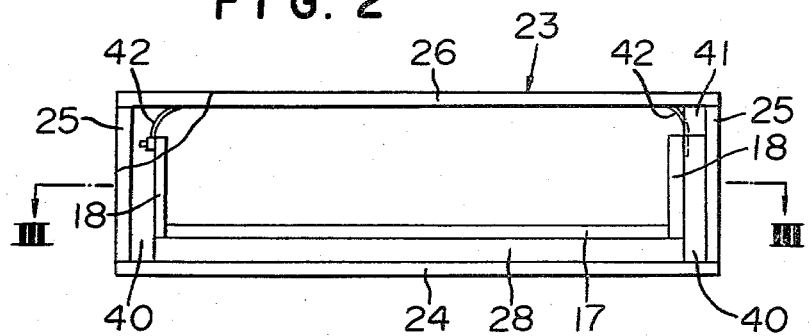
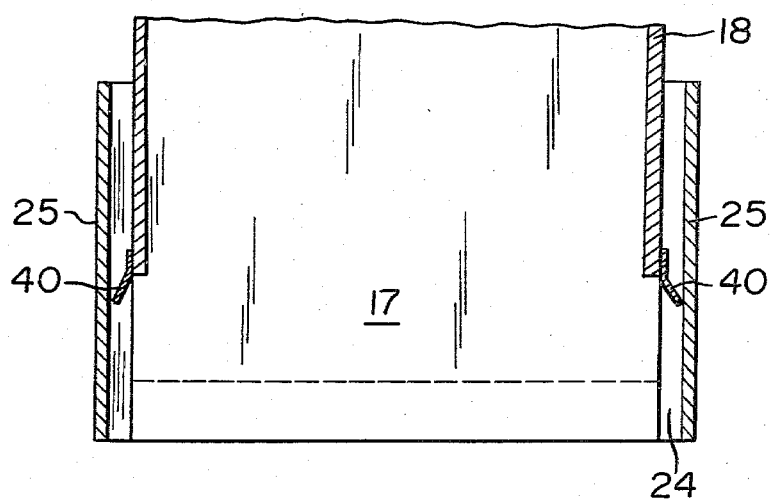
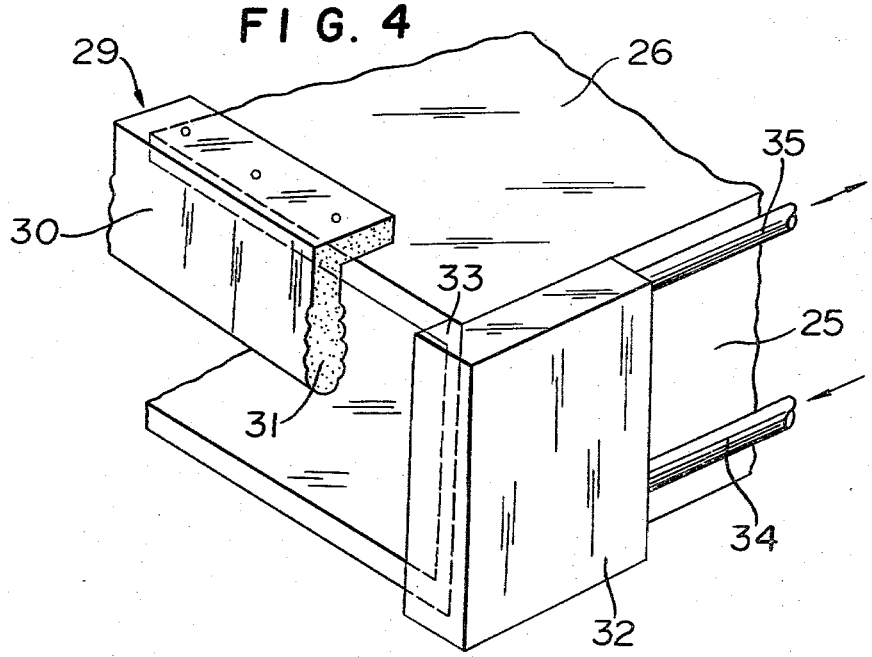

APPARATUS FOR FEEDING GLASS BATCH MATERIALS INTO A GLASS MELTING FURNACE

BACKGROUND OF THE INVENTION

1. Field of the Invention

The present invention relates to an apparatus for feeding glass batch materials into a glass melting furnace. More particularly, it relates to an improved blanket feeder type feeding apparatus.

2. Description of the Prior Art

The glass batch materials can be granular materials of a mixture of various glass forming materials which can be further mixed with glass cullet.

Various type apparatuses have been proposed as the apparatus for feeding the glass batch materials into the glass melting furnace. The typical type feeders i.e. a blanket feeder and a screw feeder have been mainly used.

In the case of the blanket feeder, a mixture of the glass batch materials is intermittently fed in the form of thin layer having wide width on the molten glass at the charging area in the glass melting furnace, through a feeding trough or plate which is reciprocally moved, as disclosed in U.S. Pat. No. 2,281,050.

In the case of the screw feeder, a mixture of the glass batch materials is continuously extruded in the form of narrow layer from a hopper onto the molten glass through a screw or a spiral propeller blade disposed in a cylindrical feed chamber, as disclosed in U.S. Pat. No. 1,906,695.

The blanket feeder has significantly high heat receiving efficiency of the glass batch materials in the melting furnace, high stability of the condition of the glass batch layer and high stability of the molten glass flow in the furnace in comparison with those of the screw feeder.

Thus, it has been considered that a melting capacity, a product quality and a thermal efficiency of the blanket feeder are respectively superior to those of the screw feeder.

Recently, the blanket feeder has been mainly used in large size tank furnace such as the glass melting furnace for manfacturing a sheet or flat glass. However, the advantageous effect of the screw feeder is to be capable of separating the atmosphere in the glass melting furnace from the outer atmosphere in the operation for feeding the glass batch materials.

Sometimes, the glass forming materials used for preparing the optical glass, the electron tube glass, the lamp glass and the cathode-ray tube glass may contain toxic or volatile materials such as lead, arsenic or boron component which poison the sanitary environment except those of the ordinary soda lime glass.

In the melting of glass containing the toxic components, the dust, mist and gas containing the toxic or volatile materials are formed in the melting furnace. It is important from the sanitary environment to carry out an operation so as to prevent the toxic materials to leak from the gap between the glass batch material feeding apparatus and the furnace structure near the charging inlet of the melting furance. It is obliged to use the screw feeder having excellent sealing effect in the melting of the glass containing the toxic materials even though the melting capacity is decreased.

In the sanitary view, it is important to consider a problem of the leakage of toxic gas components such as sulfur oxides and nitrogen oxides which are formed in the glass melting furnace when the heavy oil is burnt to melt the glass as well as to consider the environment of the furnace containing the specific toxic materials such as lead, arsenic etc.

The blanket feeder type glass batch material feeding apparatus having a function for preventing the leakage of the atmosphere of the furnace has not been developed.

One difficulty encountered in the practical use of the blanket feeder is to drop the glass batch materials from the sliding part of the trough since the glass batch materials is fed by reciprocal movement of the feeding trough. The increase of the concentration of dust in the working place caused by the fallen glass batch materials is unfavorable from the viewpoint of the sanitary environment and the maintenance of the apparatus.

SUMMARY OF THE INVENTION

It is a primary object of the present invention to provide a blanket feeder type glass batch feeding apparatus having a structure for preventing the leakage of the atmoshpere of the glass melting furnace through a batch feeding opening to the outer atmoshpere.

It is another object of the present invention is to provide a blanket feeder type glass batch feeding apparatus for preventing the falling of the glass batch materials from a sliding part of the batch feeding trough.

The foregoing and other objects of the present invention have been attained by providing a blanket feeder type glass batch feeding apparatus comprising a hooper for receiving glass batch materials; a batch feeding trough disposed near an outlet of the lower part of the hopper to receive the glass batch materials flowed down from the hopper; and a driving means for forwardly moving the batch feeding trough to a batch feeding of the glass melting furnace and then, for backwardly moving it to perform the reciprocal movement; a sealing case extending from the hopper to the batch feeding opening of the glass melting furnace to cover the batch feeding trough; a shelter plate made of heat resistant material which is suspended from the upper end of the outlet of the sealing case so as to contact with the glass batch layer fed into the glass melting furnace; a damper plate pivotally fitted to the upper part inside of the sealing case to be swung and having a lower edge being contacted with a glass batch layer on the batch feeding trough wherein the pressure in a space in the rear of the damper plate of the sealing case is kept higher than that of the atmosphere in the glass melting furnace.

BRIEF DESCRIPTION OF THE DRAWINGS

FIG. 2 is a front view of a sealing case and a feeding trough;

FIG. 3 is a sectional view taken along the III—III line of FIG. 2;

FIG. 4 is a perspective view of a water cooling device and a shelter plate disposed at the front of the sealing case;

DETAILED DESCRIPTION OF PREFERRED EMBODIMENT

Figure 1:
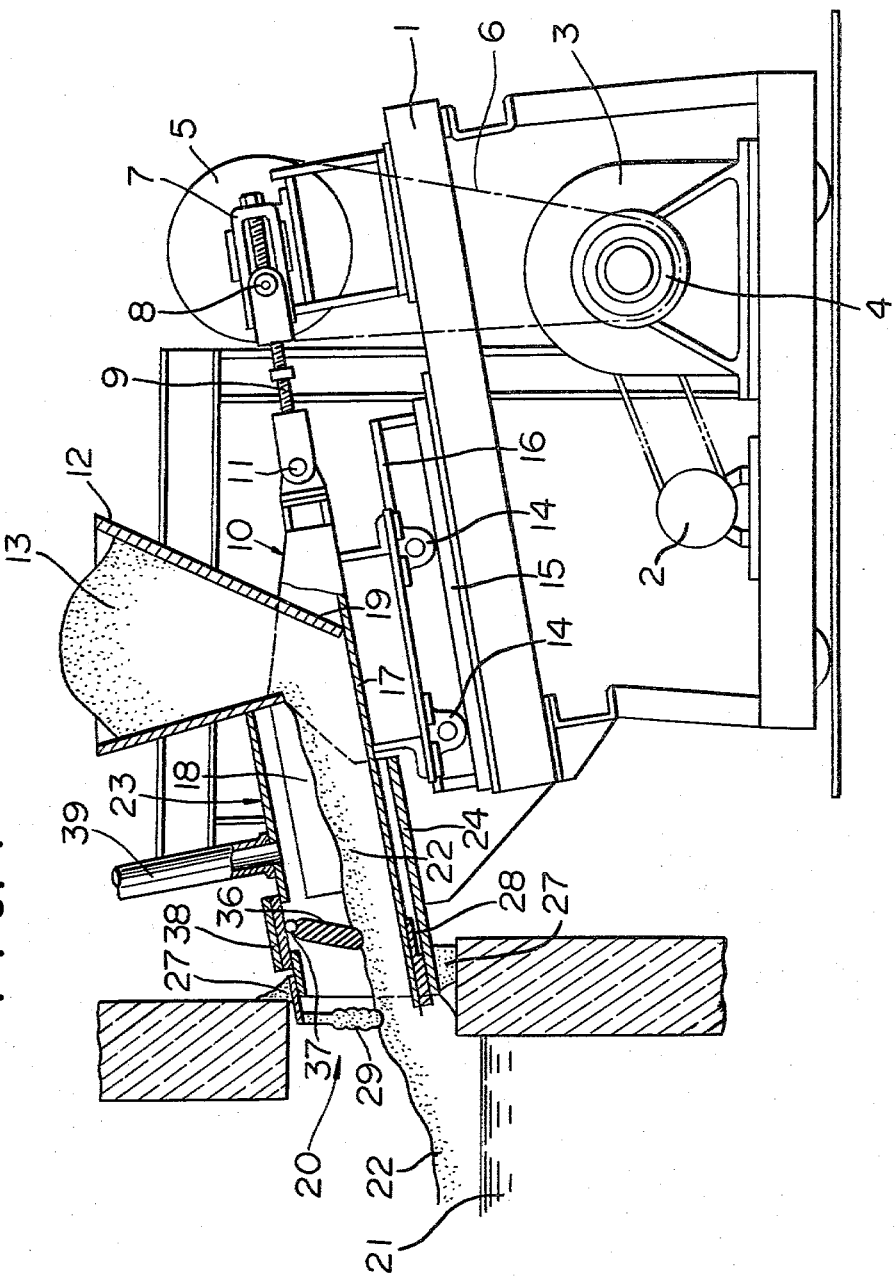
FIG. 1 is a partially sectional side view of an embodiment of the blanket feeder type glass feeding apparatus according to the present invention.

In FIG. 1, the reference numeral (1) designates a support frame on which an electric motor (2) and a reduction gear mechanism (3) connected to the electric motor are mounted at the lower part. A chain wheel (4) fitted to the driving shaft of the reduction gear mechanism (3) and a chain sprocket wheel (5) fitted to the upper part of the support frame are interconnected by a chain (6) to drive the chain sprocket wheel (5). An adjustable crank arm (7) is secured to a driving shaft (not shown) of the chain wheel (5) and one end of an adjustable link (9) is pivotally connected to a pin (8) which is eccentrically fitted to the crank arm and the other end of the adjustable link is pivotally connected to a pin (11) in the rear of a feeding trough (10), which is reciprocally moved, that is, it moves forward and back, by the conventional adjustable eccentric crank mechanism as stated the above.

A hopper (12) is disposed above the feeding trough (10) and glass batch materials (13) are fed from the inlet of the hopper (12) to reach the feeding trough.

Wheels (14) are fitted at the bottom of the feeding trough (10) and are mounted on a rail (15) disposed on the support frame. An upper rail (16) pushes the wheels (14). The numeral (17) designates a bottom plate of the feeding trough and a side plate (18) is attached to the feeding trough except the front part of the feeding trough.

The feeding trough can be reciprocally moved along the rail (14).

FIG. 1 shows a condition that the feeding trough is moved to the closest position to a batch feeding opening (20) of the melting furnace. The glass batch materials are pushed forwardly by the lower portion (19) of the rear wall of the hopper (12) as the feeding trough is moved back whereby a glass batch material layer (22) in the form of thin layer is fed from the edge of the feeding trough onto a molten glass (21) in the melting furnace.

A structure for preventing the leakage of the atmosphere in the furnace through a batch feeding opening (20) for feeding the glass batch materials of the furnace to the outside of the furnace directly or for feeding it through a glass batch material-feeding apparatus to the outside will be illustrated.

A sealing case (23) is disposed so as to surround the feeding trough (10) at the front of the hopper (12). The reference numeral (24) designates a bottom plate of the sealing case; (25) designates a side plate and (26) designates an upper plate. The edge of the sealing case (23) is fixed, in air-tight, to the wall of the batch feeding opening of the furnace through a packing (27). A sliding plate (28) is welded to the lower surface of the top edge of the bottom plate (17) so as to permit the feeding trough to slide on the inner surface of the bottom plate (24) of the sealing case.

A shelter plate (29) is suspended at the edge of the upper plate (26) of the sealing case to contact with the glass batch material layer (22). The outer surface of the shelter plate (29) comprises a thin, heat resistant metal plate (30) and the shelter plate is filled with a heat resistant—heat insulating material (31), for example, a heat-resistant fibers such as alumina fiber, high zirconia fiber, glass fiber, asbestos, rock wool etc. as shown in sectional view in FIG. 4. In order to protect the side plate (25) disposed near the outlet of the sealing case (23) and the front part thereof which is exposed at high temperature in the furnace, a water cooling box (32) is disposed in close contact with the side plate (25) of the sealing case as shown in FIG. 4. The front part (33) of the water cooling box is projected toward the central portion whereby the front part of the side plate (25) is cooled and is insulated from the heat.

The reference numeral (34) designates a feeding pipe for cooling water, and (35) designates a discharge pipe for water recycled into the water cooling box. The water cooling box (32) can be replaced to prevent the leakage of water caused by the corrosion.

The shelter plate having the construction as described the above, is disposed at the front edge of the sealing case (23) of the glass batch material-feeding apparatus and the outer wall is cooled whereby the leakage from the environment in the furnace is prevented, the deformation of the outer wall at the edge portion is prevented to enable to continuously use it for a long time.

In the embodiment of the present invention, in order to prevent the leakage of the atmosphere in the furnace into the glass batch feeding apparatus, a damper plate (36) is suspended at the upper part of the sealing case (23) so that the lower edge of the damper plate can swing while contacting with the glass batch material layer (22). The damper plate (36) is made of a heat resistant metal plate such as stainless steel plate or a leaf spring member and a rotating shaft (37) fitted at the upper part of the damper plate is supported by a heat resistant cushion member in the sealing case such as an asbestos layer (38). Accordingly, the damper plate (36) can swing and bend under contacting with the glass batch materials by its own dead weight or the action of the spring in the range from the vertical direction to about 60°.

In the embodiment of the present invention, in order to prevent the slight leakage of the atmosphere in the furnace resulted from the contacting part of the side portion of the damper plate (36) and the glass batch materials, a feeding pipe (39) for feeding fluid such as air is disposed in the rear part of the damper plate of the sealing case and a fluid is fed under a slightly positive pressure at a small flow rate from the fluid source through the feeding pipe (39) to give the pressure in a space in the rear of the damper plate higher than that of the furnace.

The pressure in the furnace is usually 0.1 to 0.4 mm$^{-aq}$ whereas the pressure in the space in the rear of the furnace is preferably kept in 0.1 to 0.3 mm$^{-aq}$ higher than that of the former whereby the scatter of the particles of the glass batch materials can be prevented advantageously. However, when the pressure is too high, the scatter of the particles is easily caused by the flow of air disadvantageously.

A structure for sealing between the sealing case (23) and the feeding trough (10) will be illustrated referring to FIGS. 2 and 3. A leaf spring (40) is fixed to the outer edge of the side plate (18) of the feeding trough so as to contact with the side plate (25) of the sealing case. Accordingly, the leaf spring (40) is reciprocally moved fore-and-aft with the feeding trough while contacting with the side plate (25) so as to prevent the leakage of the particles of the glass batch materials and the leakage of the atmosphere through the side plate (18) to the side of the sealing case. A packing layer (41) made of a heat resistant material such as asbestos is disposed from the upper end of the leaf spring (40) to the top plate (26) of the sealing case and a packing strip (42) such as asbestos is disposed on the upper end of the side plate in contact with the top plate (26) of the sealing case to prevent the leakage of the particles of the glass batch materials and the leakage of the atmosphere through the feeding trough to the sealing case.

Another embodiment of the glass batch feeding apparatus according to the present invention will be illustrated referring to FIG. 5 through FIG. 8.

An electric motor (52) and a reduction gear mechanism (53) connected to the electric motor are mounted on the support frame (51) at the lower part thereof. A chain sprocket wheel (54) fitted to a driving shaft of the reduction gear mechanism and a chain sprocket wheel (55) fitted to the upper part of the support frame are interconnected with a chain (56) to drive the chain sprocket wheel (55). An adjustable crank arm (57) is secured to the driving shaft of the chain sprocket wheel (55) and a pin (58) is eccentrically projected from the crank. One end of an adjustable link (59) is pivotally connected to the pin (58) and the other end of the link (59) is pivotally connected to a pin (61) which is disposed at the rear end of a movable shaft (68) for supporting and driving the feeding trough, which is discussed later.

Figure 6:
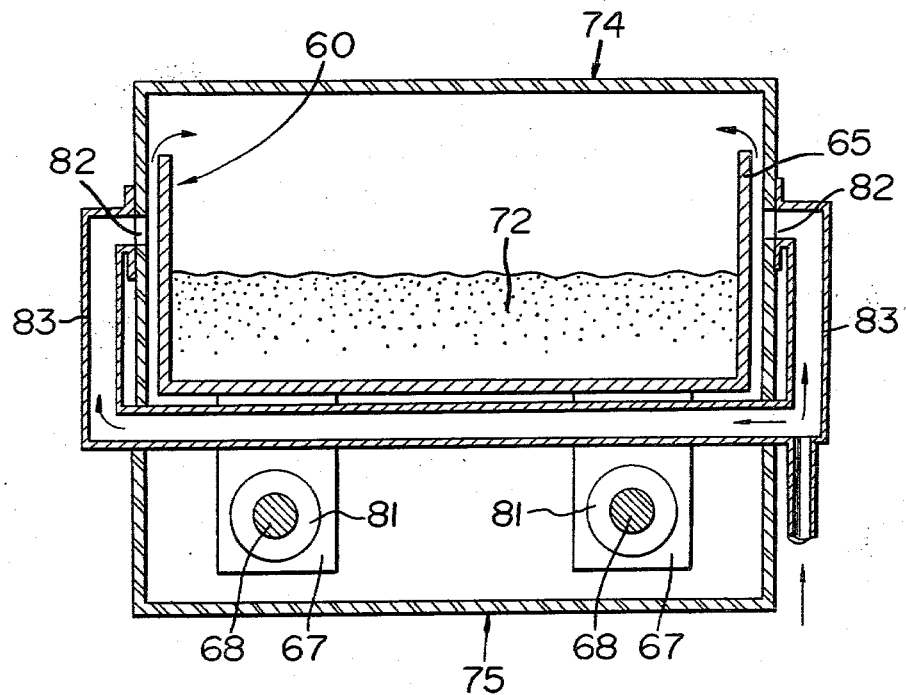
FIG. 6 is a sectional view taken along the V—V line.

Glass batch materials (63) are fed into a hopper (62) and transferred to a batch feeding trough (60) which is disposed below the hopper. The batch feeding trough comprises a bottom plate (64), a side plate (65) disposed at the rear side of the bottom plate and a rear wall (66). A trough support (67) is secured to the lower surface of the botttom plate (64) by means such as welding a H shaped steel beam to the bottom plate of the batch feeding trough. A cylindrical movable shaft (68) is disposed in longitudinal direction in parallel with the bottom plate of the batch feeding trough and is movable on a guide wheel (69) disposed on the support frame. The adjustable line (59), discussed above is pivotally connected to the pin (61) fixed to the rear end of the movable shaft (68). In the embodiment, it is usual to arrange two trough supports and two movable shafts as shown in FIG. 6.

Figure 5:
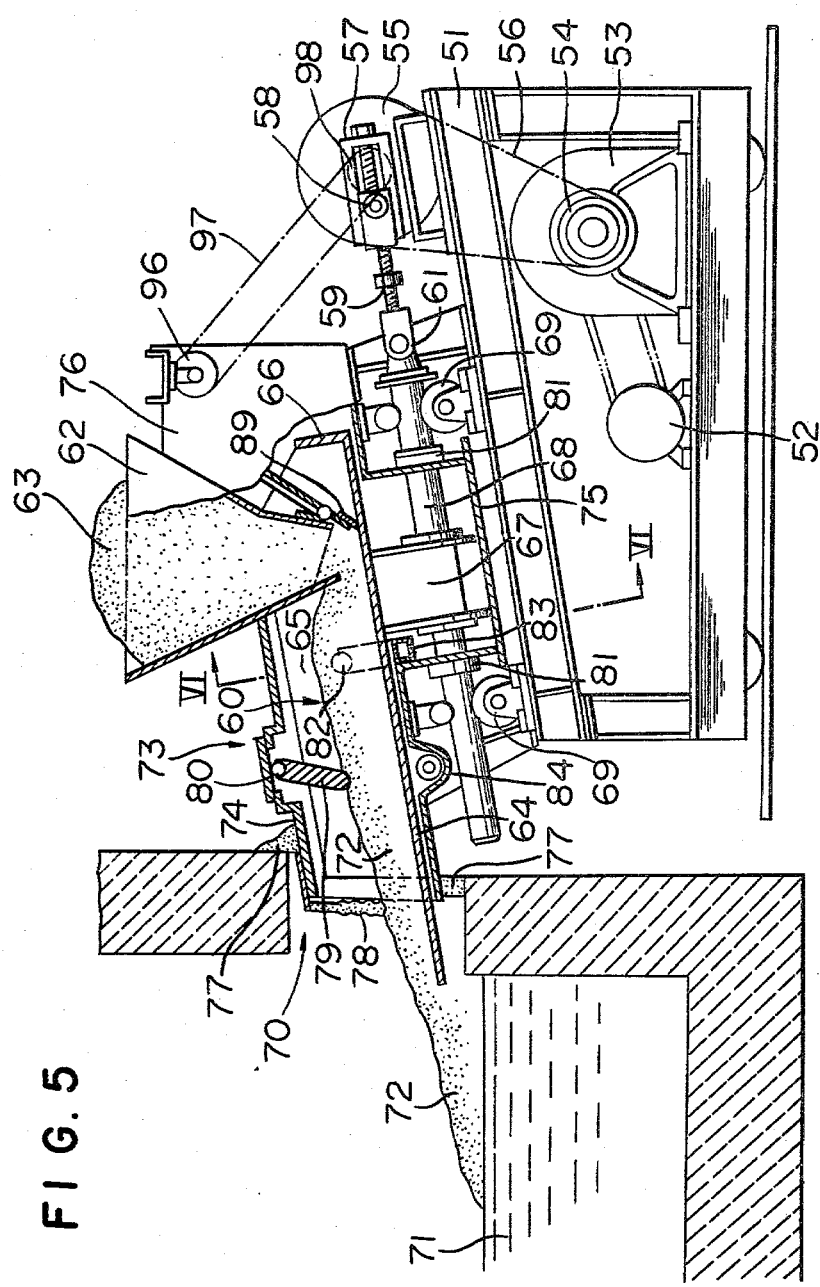
FIG. 5 is a partially sectional side view of another embodiment of the blanket feeder type glass batch feeding apparatus according to the present invention.

As similar to the description referring to FIG. 1, when the electric motor is driven, the movable shaft (68) connected through the eccentric crank mechanism to the adjustable link is reciprocally moved along the guide wheel (69) to give a reciprocal movement of the feeding trough (60). FIG. 5 shows a condition that the feeding trough is moved to the closest position to the batch feeding opening (70) of the glass melting furnace. As the feeding trough moves backward, the lower part of the hopper (62) pushes the glass batch material forwardly to feed it in the form of thin layer (72) on a molten glass (71) from the edge of the bottom plate (64) of the feeding trough.

A sealing case (73) comprises three parts: a front part (74) which covers a main portion of the batch feeding trough (60) and extends from the lower portion of the hopper (62) to the batch feeding opening (70), a lower part (75) which covers the trough support (67) and the movable shaft (68) near the trough support and a rear part which covers the batch feeding trough in the rear of the hopper (62). An outlet of the front part (74) of the sealing case is fixed to the wall of the batch feeding opening (70) of the furnace with a packing member while keeping air-tight to prevent the leakage of the atmosphere of the furnace toward the outside of the furnace directly.

A shelter plate (78) is suspended from the upper end of the outlet of the front part (74) of the sealing case to contact with the glass batch material layer (72). The detail of the shelter plate has been discussed in the first embodiment.

A water cooling box can be disposed so as to protect the side plate near the outlet of the front part (74) of the sealing case as shown in FIG. 4.

In order to prevent the leakage of the atmosphere in the furnace through the apparatus and to protect from the thermal damage, a damper plate (79) may be disposed inside of the front part (74) of the sealing case in addition to the provision of the shelter plate (78). The damper plate (79) is pivotally fitted to a rotating shaft (80) in the sealing case so as to contact the lower edge of the damper plate with the glass batch layer (72).

The lower part (75) of the sealing case surrounds the trough support entirely. The movable shaft (68) is passed through the front opening and the rear opening of the lower part of the sealing case to extend to the outside of the case. A bearing (81) having the air-tight ground structure is disposed to keep the opening under air-tight condition.

In one of the features of the batch feeding apparatus of the embodiment, only the movable shaft penetrates the sealing case among the structural elements fixed to the feeding trough. Accordingly, when the movable shaft is reciprocally moved for the reciprocal movement of the feeding trough, the leakage of the atmosphere of the feeding trough can be prevented since the sealing means is provided at the opening of the lower part of the sealing case.

The pressure in a space formed in the rear of the damper plate in the sealing case is maintained higher than that of the atmosphere of the furnace to prevent that the atmosphere of the furnace leaks from the side and the lower portion of the damper plate (79) disposed at the inside of the sealing case to the rear portion of the damper. In the embodiment, a fluid (air) is fed from an opening (82) formed in the side wall of the sealing case through a fluid feeding pipe (83) into the sealing case as shown in FIG. 6.

The glass batch materials naturally fallen down in the sealing case from the side plate or the edge of the feeding trough by the reciprocal movement of the feeding trough (60).

Figure 7:
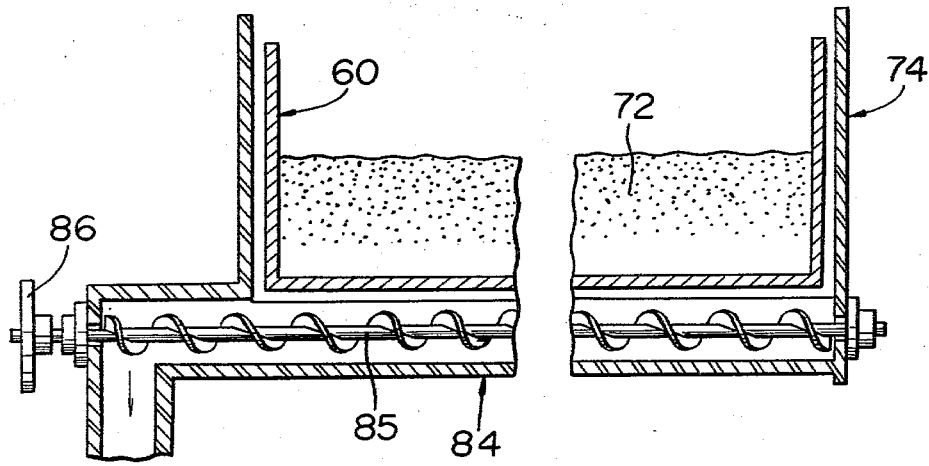
FIG. 7 is a sectional view of a batch collecting channel.

When an amount of the fallen glass batch materials reaches to a predetermined amount, the reciprocal movement of the feeding trough is prevented. In the apparatus for feeding glass batch materials according to the invention, a batch collecting channel (84) is formed in the bottom plate of the front part (70) of the sealing case to recover the fallen glass batch materials as shown in FIG. 7. A screw conveyor (85) is disposed in the channel and is optionally actuated to discharge the glass batch materials when it is accumulated in the channel. A chain wheel (86) is fitted to the shaft of the screw conveyor and is connected to a driving source by means of a chain.

The apparatus according to the invention further comprises a pushing means for pushing the glass batch materials at the lower portion of the hopper to prevent the leakage of the glass batch materials to the rear part of the feeding trough.

Figure 8:
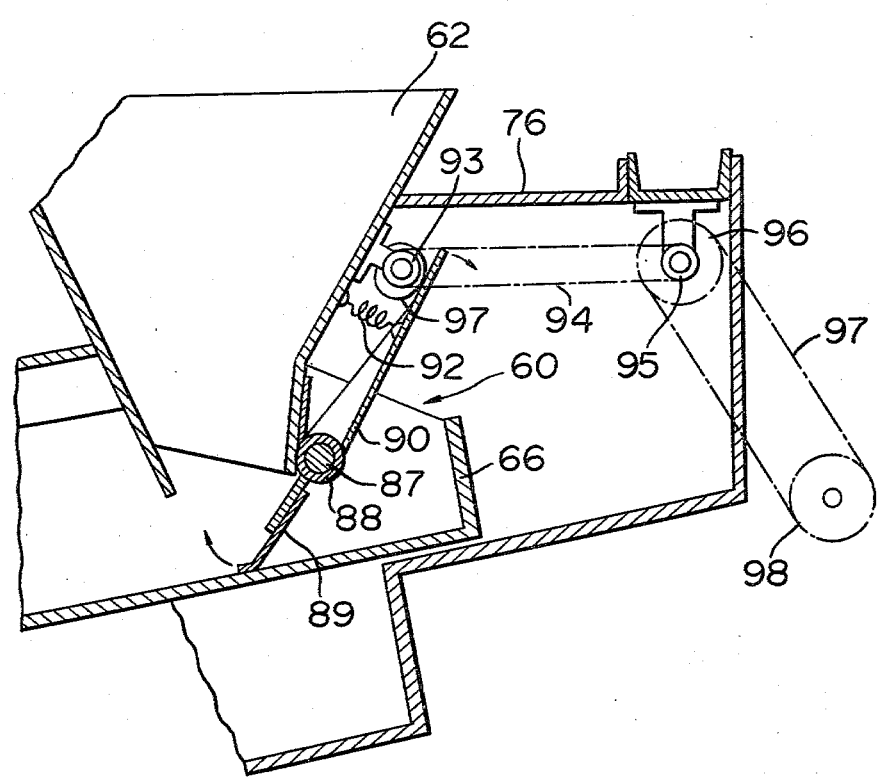
FIG. 8 is a sectional view of a batch pushing means disposed in the rear of the apparatus.

As shown in FIG. 8, a pivoting shaft (87) serving as the rotation center extending across through the feeding trough is secured at the side plates which are disposed behind the rear wall of the lower part of the hopper (62). A hollow cylinder (88) is turnably fitted around the pivoting shaft (87) and a scraping plate (89) which is downwardly extended in slant to reach the bottom of the feeding trough, is secured to the hollow cylinder (88). The scraping plate is made of a thin metal plate having high elasticity. A lever (90) having T shaped sectional view which is upwardly extended in slant and is fixed to the hollow cylinder and the top edge of the lever contacts with a cam (91). A spring (92) disposed between the lever (90) and the rear wall of the hopper pulls the lever (90) to forcibly contact it with the cam (91). A chain wheel (93) is disposed in coaxial with the cam (91) and is connected through a chain (94) with a chain wheel (95) fitted to the rear part (76) of the sealing case. A chain wheel (96) having larger diameter is disposed in coaxial with the chain wheel (95) and is connected through a chain (97) to a chain wheel having small diameter which is disposed in coaxial with a chain wheel (55) for driving the feeding trough.

In the arrangement, when the feeding trough is backwardly moved, the scraping plate (89) synchronously slides in contact with the bottom plate of the feeding trough to prevent the leakage of the glass batch materials behind the feeding trough, that is, when the feeding trough starts to move backwardly, the chain wheels (98), (96), (95) and (93) are driving under synchronizing with the movement of the feeding trough whereby the cam (91) backwardly pushes the lever (90). Then, the scraping plate (89) is forwardly turned around the pivoting shaft (87) (as indicated by an arrow line) from the condition contacting with the feeding trough, depending upon the movement of the lever to push the glass batch materials forwardly whereby the backward movement of the glass batch materials is prevented. When the feeding trough is forwardly moved, the edge of the scraping plate is slightly separated from the bottom of the feeding trough and when the forward movement is completed, the edge of the scraping plate is touched with the bottom again, as shown in FIG. 8. The movement is repeated under synchronizing with the reciprocal movement of the feeding trough whereby the glass batch materials can not be accumulated in the rear portion of the feeding trough.

What is claimed as new and desired to be secured by Letters Patent of the United States is:

1. In a blanket feeder type apparatus for feeding glass batch materials into a glass melting furnace including a batch feeding opening, said apparatus comprising a hopper for receiving glass batch materials; a batch feeding trough disposed near an outlet of the lower part of the hopper to receive the glass batch materials flowed from the hopper; and a driving means for forwardly moving the batch feeding trough to a batch feeding opening of the glass melting furnace and for backwardly moving it to perform reciprocal movement, an improvement which comprises a sealing case having an outlet adjacent said batch feeding opening and extending from the hopper to said batch feeding opening of the glass melting furnace to cover the batch feeding trough; a shelter plate made of heat resistant material which is suspended from the upper end of said outlet of the sealing case so as to contact with the glass batch layer feed into the glass melting furnace; a swingable damper plate having a rear in a direction opposite said glass melting furnace, pivotally fitted to the upper part of the inside of the sealing case and having a lower edge being contacted with a glass batch layer on the batch feeding trough; and a positive pressure keeping means adapted for keeping the pressure in a space in said rear of the damper plate of the sealing case higher than that of an atmosphere in the glass melting furnace.

2. An apparatus according to claim 1 wherein the positive pressure keeping means is disposed in the sealing case and comprises a fluid feeding pipe for feeding a fluid to the space in the rear of the damper plate.

3. An apparatus according to claim 1 which comprises replaceable water cooling boxes at both sides of the outlet of the sealing case.

4. An apparatus according to claim 1 wherein a leaf spring is secured at each end of both side plates of the batch feeding trough so as to contact with a side plate of the sealing case; a packing layer is disposed on the upper end of the leaf spring to contact with the upper surface of the sealing case; and a packing strip is disposed on the upper end of the side plate of the feeding trough whereby the leakage of the glass batch materials and the leakage of the fluid from the feeding trough into the sealing case are prevented.

5. In a blanket feeder type apparatus for feeding glass batch materials into a glass melting furnace comprising a hopper for receiving glass batch materials; a batch feeding trough disposed near an outlet of the lower part of the hopper to receive the glass batch materials flowed from the hopper; and a driving means for forwardly moving the batch feeding trough to a batch feeding opening of the glass melting furnace and for backwardly moving it to perform reciprocal movement, an improvement which comprises a movable shaft secured to a trough support fixed to the lower surface of the batch feeding trough to support it and connected to the driving means to actuate the reciprocal movement of the batch feeding trough; a sealing case having an outlet surrounding the batch feeding trough, the trough support and the movable shaft disposed near the trough support, and said sealing case having an edge portion extending to a batch feeding opening of the glass melting furnace; a shelter plate made of heat resistant material which is suspended from the upper end of said outlet of the sealing case so as to contact with the glass batch layer fed into the glass melting furnace; a swingable damper plate having a rear in a direction opposite said glass melting furnace, pivotally fitted to the upper part inside of the sealing case and having a lower edge being contacted with a glass batch layer on the batch feeding trough; and a positive pressure keeping means adapted for keeping the pressure in a space in said rear of the damper plate of the sealing case higher than that of the atmosphere in the glass melting furnace.

6. An apparatus according to claim 5 wherein the positive pressure keeping means is disposed in the sealing case and comprises a fluid feeding pipe for feeding a fluid to the space in the rear of the damper plate.

7. An apparatus according to claim 5 which comprises replaceable water cooling boxes both sides of the outlet of the sealing case.

8. An apparatus according to claim 5 wherein a batch collecting channel is formed in the bottom plate of the sealing case to collect the glass batch material which has fallen down from the batch trough into the sealing case.

9. An apparatus according to claim 5 wherein a scraping plate extending to the bottom plate of the batch feeding trough is disposed at the wall in the rear of the lower part of the hopper to push the glass batch materials forwardly in synchronizing with the reciprocal movement of the batch feeding trough whereby the backward movement of the glass batch materials to the rear part of the batch feeding trough is prevented.

* * * * *